(12) United States Patent  
McFarlane et al.

(10) Patent No.: US 8,070,099 B2
(45) Date of Patent: Dec. 6, 2011

(54) AIRCRAFT BAFFLE SEAL

(75) Inventors: Daniel Shane McFarlane, Lawrence, KS (US); David Adonis McFarlane, Baldwin City, KS (US)

(73) Assignee: Horizon, LLC, Baldwin City, KS (US)

( * ) Notice: Subject to any disclaimer, the term of this patent is extended or adjusted under 35 U.S.C. 154(b) by 444 days.

(21) Appl. No.: 12/576,019

(22) Filed: Oct. 8, 2009

(65) Prior Publication Data

US 2010/0155534 A1 Jun. 24, 2010

Related U.S. Application Data

(63) Continuation of application No. 11/361,734, filed on Feb. 24, 2006, now abandoned.

(51) Int. Cl.
*B64C 1/10* (2006.01)
(52) U.S. Cl. .................. 244/121; 244/133; 60/806
(58) Field of Classification Search .............. 244/121, 244/133, 119, 129.4; 428/365, 370, 375, 428/446; 60/806
See application file for complete search history.

(56) References Cited

U.S. PATENT DOCUMENTS

| 2,355,829 | A |  | 8/1944 | Tyler |
|---|---|---|---|---|
| 2,417,945 | A |  | 3/1947 | Parker |
| 2,581,845 | A |  | 1/1952 | Elliott |
| 2,638,287 | A |  | 5/1953 | Avondoglio |
| 2,641,024 | A |  | 6/1953 | Panagrossi |
| 4,133,927 | A |  | 1/1979 | Tomoda et al. |
| 4,344,633 | A |  | 8/1982 | Niksa |
| 4,398,989 | A |  | 8/1983 | Allen et al. |
| 4,686,135 | A |  | 8/1987 | Obayashi et al. |
| 4,884,772 | A |  | 12/1989 | Kraft |
| 5,461,107 | A |  | 10/1995 | Amin |
| 5,910,094 | A |  | 6/1999 | Kraft |
| 5,943,856 | A | * | 8/1999 | Lillibridge et al. ............ 60/262 |
| 6,328,023 | B1 | * | 12/2001 | Sage .......................... 123/559.1 |
| 2002/0088208 | A1 | * | 7/2002 | Lukac et al. .................... 55/289 |
| 2004/0240988 | A1 | * | 12/2004 | Franconi et al. .............. 415/145 |
| 2007/0245739 | A1 | * | 10/2007 | Stretton et al. ................. 60/728 |

FOREIGN PATENT DOCUMENTS

GB 2444363 A * 6/2008

OTHER PUBLICATIONS

Additional file history for related U.S. Appl. No. 11/361,734, dated Nov. 27, 2009, 17 pages.
McFarlane, Daniel S.; Declaration to Comply With 37 CFR 1.56, dated Apr. 17, 2006.
McFarlane, David A.; Declaration to Comply With 37 CFR 1.56, dated Apr. 17, 2006.
Select file history of U.S. Appl. No. 11/361,734, dated Sep. 29, 2008 to Oct. 7, 2009, 101 pages.

* cited by examiner

*Primary Examiner* — Christopher P Ellis
(74) *Attorney, Agent, or Firm* — Lathrop & Gage LLP

(57) ABSTRACT

Aircraft systems having baffle seals with low coefficients of friction and methods of assembling aircraft systems are disclosed herein. In one embodiment, an aircraft system includes: (a) an aircraft baffle; (b) an aircraft cowl separated from the aircraft baffle by a gap, the aircraft cowl having a contact surface; and (c) a flexible aircraft baffle seal extending from the aircraft baffle to the aircraft cowl to seal the gap, the aircraft baffle seal having a contact side for contacting the contact surface of the aircraft cowl, the contact side having a kinetic coefficient of friction that is not more than 0.4, the aircraft baffle seal comprising an elastomer sheet and a laminate, the laminate being the contact side.

14 Claims, 5 Drawing Sheets

AIRCRAFT BAFFLE SEAL

RELATED APPLICATIONS

This application is a continuation application claiming priority to U.S. patent application Ser. No. 11/361,734, filed Feb. 24, 2006 now abandoned, the disclosure of which is incorporated herein by reference.

BACKGROUND

Most modern aircraft with reciprocating engines employ a cooling system known as "pressure cooling". Pressure cooling is accomplished by placing a cowling around an engine and then using a system of baffles and seals to induce airflow around the engine cylinders to achieve even cooling with minimum drag. Most pressure cooling systems are "downdraft" type systems where, in conjunction with the placement of the air inlet and outlet, the baffles and seals create a high pressure region above the engine and a corresponding low pressure region below the engine. The resulting pressure differential between the two regions produces a top-to-bottom airflow around the engine cylinders.

The baffles are typically of aluminum sheet metal construction and attach to brackets on the engine. The baffles extend from the engine almost to the engine cowl, and there is normally a small gap (1 to 4 inches is common) between the baffle and the cowl to allow for engine vibration and movement. This gap is sealed by baffle seals.

Baffle seals are typically made from a flexible material, such as neoprene or silicone rubber, and they are sometimes reinforced with fiberglass. The baffle seals are commonly stapled or riveted to the baffles and extend to the cowl to prevent air from by-passing the baffles. The baffle seals are typically wider than the gap they must seal, and the excess seal material bends forward such that the pressure differential between the high pressure and low pressure regions forces the baffle seal against an inner surface of the cowl (also referred to herein as "cowl contact surface").

Due to constant flexing, mishandling during cowl installation, and a harsh operating environment, baffle seals have a limited useful life and must be replaced as part of regular maintenance. There are currently three types of baffle seal material commonly used to replace baffle seals: 1) un-reinforced silicone rubber (e.g., Federal Specification ZZ-R-765 Class 2B Grade 60 Silicone); 2) fiberglass reinforced silicone rubber (e.g., AMS 3320 Glass Cloth Reinforced Silicone Sheet); 3) neoprene coated fiberglass (e.g., AMS 3783 Chloroprene Coated Glass Cloth, a.k.a., T8071). All three of these materials are available in bulk from many aircraft supply companies. Replacement seals ordered from aircraft manufacturers appear to be either AMS 3320 Glass Cloth Reinforced Silicone Sheet or AMS 3783 Chloroprene Coated Glass Cloth, depending on the manufacturer and the aircraft vintage.

All three types of baffle seal material have a common shortcoming; they do not have a sufficiently low coefficient of friction. A low coefficient of friction is especially important, not just to extend the life of the baffle seals, but also to prevent damage to the cowl and attaching hardware. Friction between the baffle seal and the cowl contact surface transfers engine vibration to the cowl. This vibration locally erodes the cowl where the baffle seal contacts it and fatigues the cowl and all hardware attached to it, which eventually necessitates costly repairs.

Using the ASTM D 1894-01 test method with an opposing surface of stainless steel with a #8 finish, a cross head speed of 6 inches per minute, and modified with 0.25 psi surface pressure instead of 0.07 psi to more accurately reflect the conditions under which the materials are used, we found AMS 3783 Chloroprene coated fiberglass to have a static coefficient of friction of 0.616 and a kinetic coefficient of friction of 0.495. We found ZZ-R-765 Class 2b Grade 60 Silicone to have a static coefficient of friction of 2.28 and a kinetic coefficient of friction of 3.02.

Replacement baffle seals are commonly coated with a powder for shipping purposes, but this powder is quickly rubbed off, either before or during installation or when the baffle seal interacts with the cowl. This powder is not part of the baffle seals, and it offers no sustained reduction in the material's coefficient of friction. It should be understood that "baffle seal" and "sheet of material" as used herein do not include powders used topically for shipping or otherwise that do not provide more than a momentary reduction in coefficient of friction.

SUMMARY

An aircraft system having a baffle seal that reduces the high baffle seal friction that is common in the prior art would reduce the amount and magnitude of repairs associated with high baffle seal friction. Accordingly, innovative aircraft systems and methods of assembling aircraft systems are disclosed herein. An aircraft system of one embodiment includes: (a) an aircraft baffle; (b) an aircraft cowl separated from the aircraft baffle by a gap, the aircraft cowl having a contact surface; and (c) a flexible aircraft baffle seal extending from the aircraft baffle to the aircraft cowl to seal the gap, the aircraft baffle seal having a contact side for contacting the contact surface of the aircraft cowl, the contact side having a kinetic coefficient of friction that is not more than 0.4, the aircraft baffle seal comprising an elastomer sheet and a laminate, the laminate being the contact side.

In another embodiment, an aircraft system includes: (a) an aircraft baffle; (b) an aircraft cowl separated from the aircraft baffle by a gap, the aircraft cowl having a contact surface; and (c) an aircraft baffle seal extending from the aircraft baffle to the aircraft cowl to seal the gap, the aircraft baffle seal comprising a sheet of material having a flexible primary layer and a flexible contact layer presenting a contact side for contacting the contact surface of the cowl, the contact side having a kinetic coefficient of friction that is not more than 0.4.

In yet another embodiment, a method of assembling an aircraft system includes the step of fastening a flexible baffle seal having a contact side with a kinetic coefficient of friction that is not more than 0.4 to an aircraft baffle such that the contact side contacts a contact surface of an aircraft cowl.

DETAILED DESCRIPTION

Figure 1:
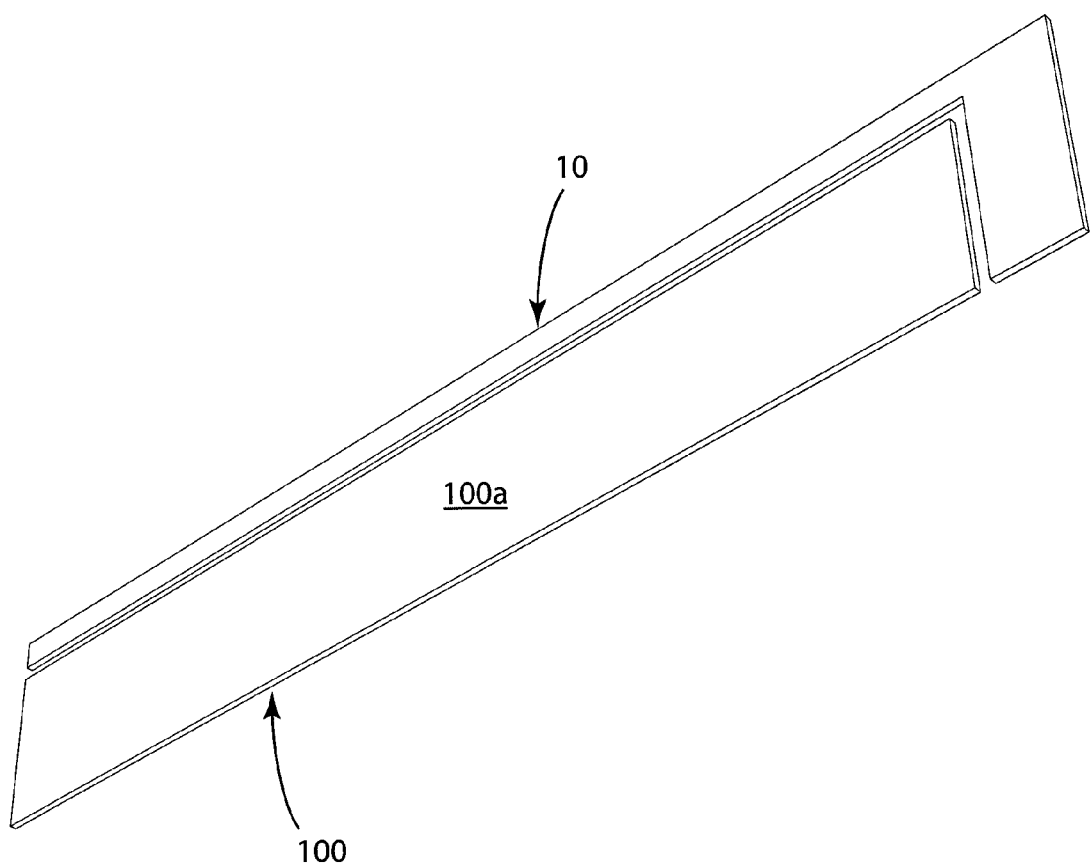
FIG. 1 shows an uninstalled baffle seal separated from a larger sheet of material in accordance with an illustrative embodiment of the invention.

FIG. 1 shows an uninstalled baffle seal 100 that has a low coefficient of friction. Baffle seal 100 is generally elongate and is dimensioned to seal a gap between an aircraft's baffle and cowl so that air does not escape between the baffle and the cowl. Baffle seal 100 may be manufactured having appropriate dimensions, or baffle seal 100 may be cut (or otherwise separated) from a larger sheet of material 10. "Baffle seal" and "sheet of material" as used herein do not include powders used topically for shipping or otherwise that do not provide more than a momentary reduction in coefficient of friction.

Figure 2:
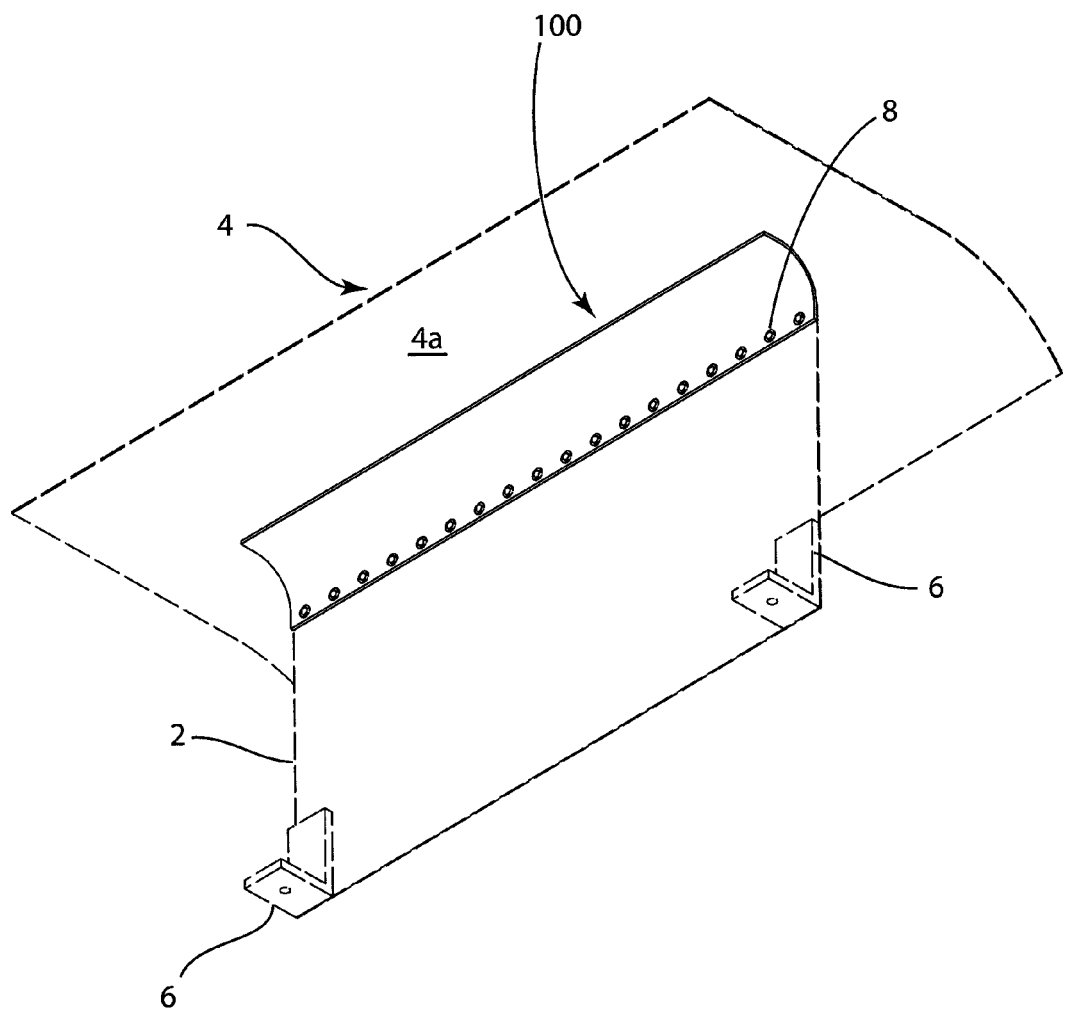
FIG. 2 shows the baffle seal of FIG. 1 installed.
Figure 3:
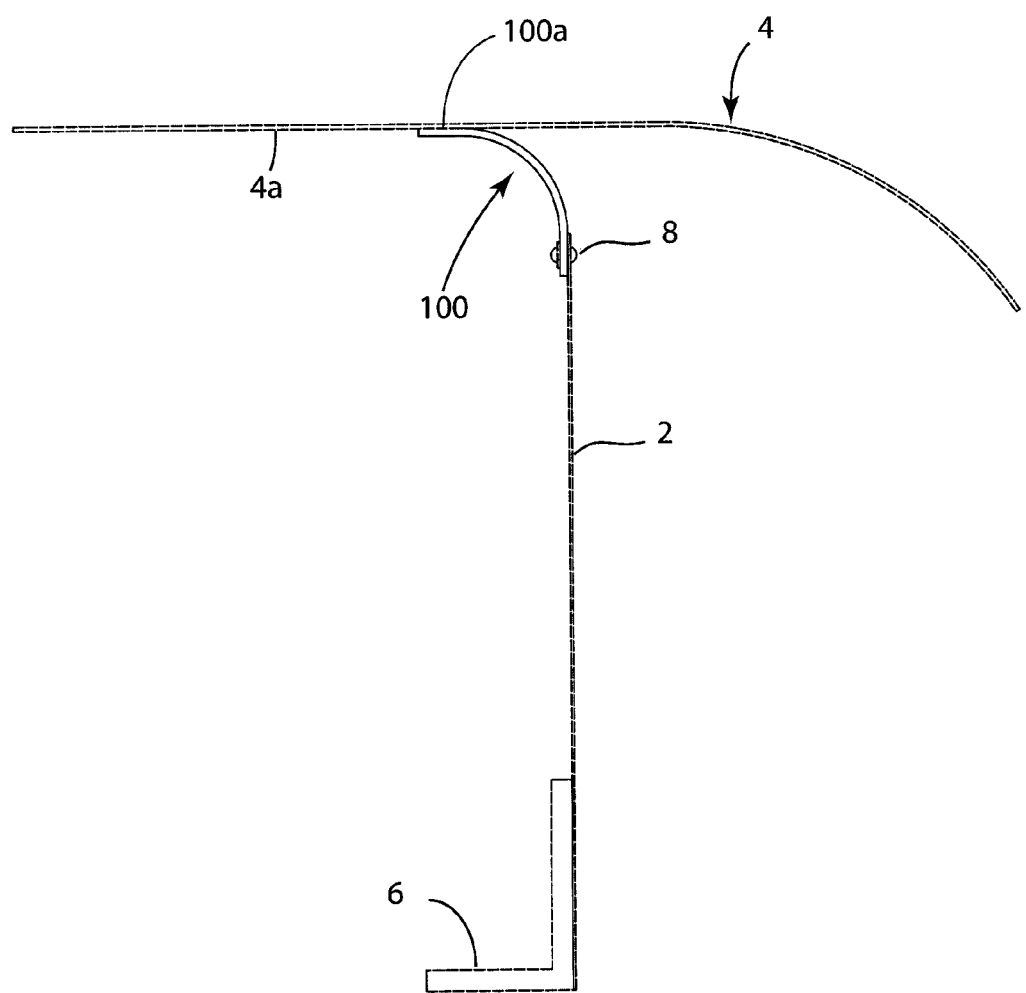
FIG. 3 shows a side view of FIG. 2.

FIGS. 2 and 3 show the baffle seal 100 in an exemplary method of use—fastened to an aircraft's baffle 2 and pressed against a contact surface 4a of the aircraft's cowl 4 to keep air from escaping between baffle 2 and cowl 4. Baffle 2 is attached to the aircraft's engine (e.g., by mounting brackets 6). Baffle seal 100 is shown fastened to baffle 2 by rivets 8, though other fasteners (e.g., staples) may alternately or additionally be used. Baffle seal 100 has a contact side 100a that contacts the cowl contact surface 4a, as shown in FIG. 3. Contact side 100a has a low coefficient of friction (i.e., not more than 0.4), and the low coefficient of friction reduces the transfer of engine vibration to cowl 4 and extends the life of baffle seal 100, cowl 4, and other attaching hardware. "Coefficient of friction" as used herein includes only kinetic coefficient of friction unless specifically noted otherwise.

Figure 4:
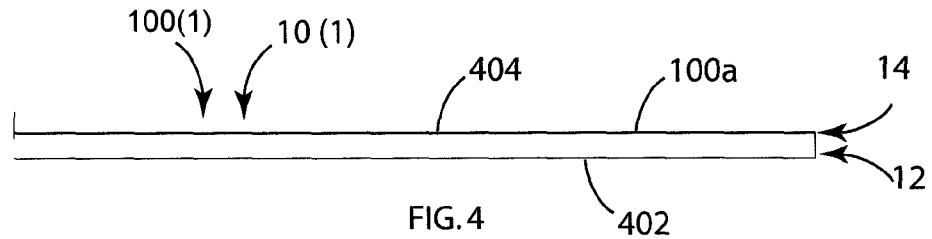
FIG. 4 shows a side view of a baffle seal constructed from a sheet of material in accordance with an illustrative embodiment of the invention.

FIG. 4 shows a side view of a baffle seal 100(1) constructed from a sheet of material 10(1). Sheet 10(1) comprises a flexible primary layer 12 and a flexible contact layer 14 that presents contact side 100a. Flexible primary layer 12 includes an elastomer sheet 402 (e.g., a silicone sheet), and flexible contact layer 14 includes a thin laminate 404 at contact side 100a. Thin laminate 404 has a low coefficient of friction (i.e., not more than 0.4), and may include, for example, polytetrafluoroethylene (PTFE), fluorinated ethylene propylene copolymer (FEP), a copolymer of ethylene and tetrafluoroethylene (ETFE), a proprietary blend of fluoropolymers and other high-performance resins (such as Teflon®-S), or a perfluoroalkoxy polymer resin (PFA) (all of the above are commonly sold under the registered trademark "Teflon") at contact side 100a. While it is presently preferred (according to one embodiment) that flexible primary layer 12 is from 0.06 to 0.13 inches thick and flexible contact layer 14 is from 0.002 to 0.010 inches thick, other dimensions may also be suitable. Similarly, it is presently preferred (according to one embodiment) that elastomer sheet 402 includes silicone having a minimum tear strength of 140 lb/in using the tear strength test method of ASTM D624 Die C, though other elements or compositions having a similar tear strength or silicone having a different tear strength may also be suitable.

Using the ASTM D 1894-01 test method with an opposing surface of stainless steel with a #8 finish, a cross head speed of 6 inches per minute, and modified with 0.25 psi surface pressure instead of 0.07 psi to more accurately reflect the conditions under which the materials are used, we found a sample of material 10(1) having a flexible primary layer 12 of ZZ-R-765 Class 2B Grade 60 Silicone 0.120 inches thick and a flexible contact layer 14 of DuPont® FEP Type C film 0.003 inches thick to have a static coefficient of friction from 0.18 to 0.21 and a kinetic coefficient of friction from 0.22 to 0.25. DuPont® FEP Type C film indicates that one side of the film is cementable; the non-cementable side was contact side 100a.

Figure 5:
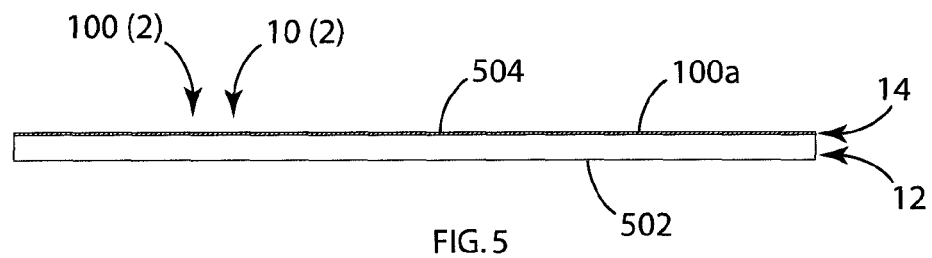
FIG. 5 shows a side view of a baffle seal constructed from a sheet of material in accordance with an illustrative embodiment of the invention.

FIG. 5 shows a side view of a baffle seal 100(2) constructed from a sheet of material 10(2). Sheet 10(2) comprises flexible primary layer 12 and flexible contact layer 14 that presents contact side 100a. Flexible primary layer 12 includes an elastomer sheet 502 (e.g., a silicone sheet), and flexible contact layer 14 includes a fiber cloth 504 at contact side 100a. Fiber cloth 504 has a low coefficient of friction (i.e., not more than 0.4) at contact side 100a, and may include, for example, fiberglass, woven polyamide fibers such as those commonly sold as "nylon", or woven para-aramid fibers such as those commonly sold as DuPont™ Kevlar® at contact side 100a.

Figure 6:
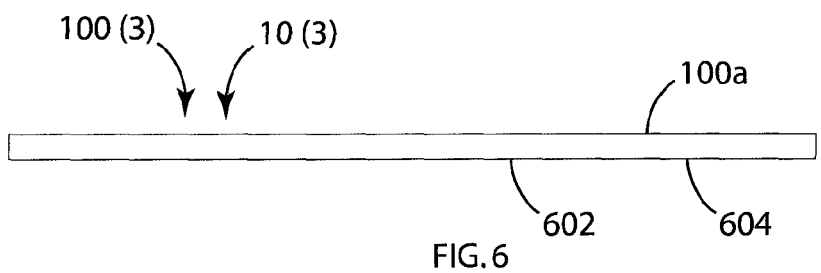
FIG. 6 shows a side view of a baffle seal constructed from a sheet of material in accordance with an illustrative embodiment of the invention.

FIG. 6 shows a side view of a baffle seal 100(3) constructed from a sheet of material 10(3) that includes an elastomer sheet 602 (e.g., a silicone sheet) compounded with an antifriction additive 604. The antifriction additive may include, for example, a fluoroadditive (e.g., DuPont™ Zonyl® or another PTFE, FEP, ETFE, Teflon®-S, or PFA powder) or molybdenum disulphide. Elastomer sheet 602 compounded with antifriction additive 604 has a low coefficient of friction (i.e., not more than 0.4) at contact side 100a.

Figure 7:
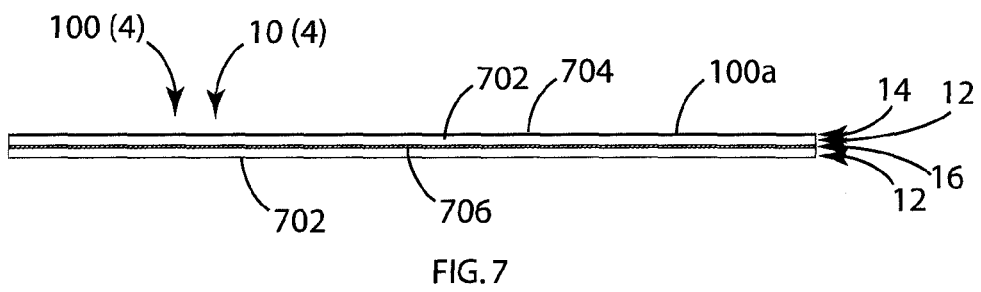
FIG. 7 shows a side view of a baffle seal constructed from a sheet of material in accordance with an illustrative embodiment of the invention.

FIG. 7 shows a side view of a baffle seal 100(4) constructed from a sheet of material 10(4). Sheet 10(4) comprises flexible primary layer 12, flexible contact layer 14 that presents contact side 100a, and a flexible third layer 16 inside primary layer 12 for reinforcing and increasing the durability of primary layer 12. Flexible primary layer 12 includes an elastomer sheet 702 (e.g., a silicone sheet), and flexible contact layer 14 includes a thin laminate 704 at contact side 100a. Third layer 16 includes a fiber cloth 706 inside elastomer sheet 702. Thin laminate 704 has a low coefficient of friction (i.e., not more than 0.4) at contact side 100a, and may include, for example PTFE, FEP, ETFE, Teflon®-S, or PFA. Fiber cloth 706 may include, for example, fiberglass cloth, and fiber cloth 706 may reinforce elastomer sheet 702 to increase the strength and durability of elastomer sheet 702.

Figure 8:
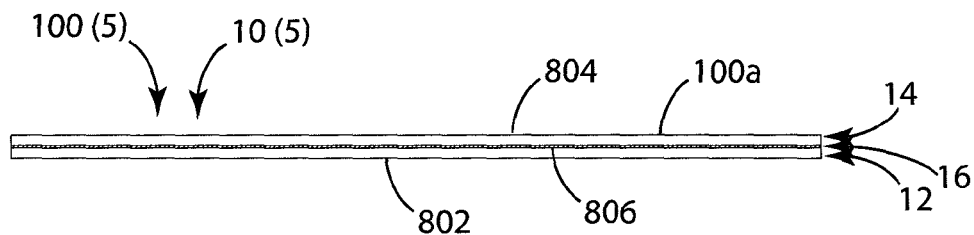
FIG. 8 shows a side view of a baffle seal constructed from a sheet of material in accordance with an illustrative embodiment of the invention.

FIG. 8 shows a side view of a baffle seal 100(5) constructed from a sheet of material 10(5). Sheet 10(5) comprises flexible primary layer 12, flexible contact layer 14 that presents contact side 100a, and flexible third layer 16 for reinforcing and increasing the durability of primary layer 12. Flexible primary layer 12 includes a standard elastomer 802, flexible contact layer 14 includes a low-friction elastomer 804, and third layer 16 includes a fiber cloth 806. Standard elastomer 802 and low-friction elastomer 804 are on opposed sides of fiber cloth 806. Low-friction elastomer 804 is at contact side 100a. Standard elastomer 802 may include, for example, silicone; low-friction elastomer 804 may include, for example, a fluoroelastomer with antifriction additives; and fiber cloth 806 may include, for example, fiberglass cloth. Low-friction elastomer 804 has a low coefficient of friction (i.e., not more than 0.4) at contact side 100a.

Figure 9:
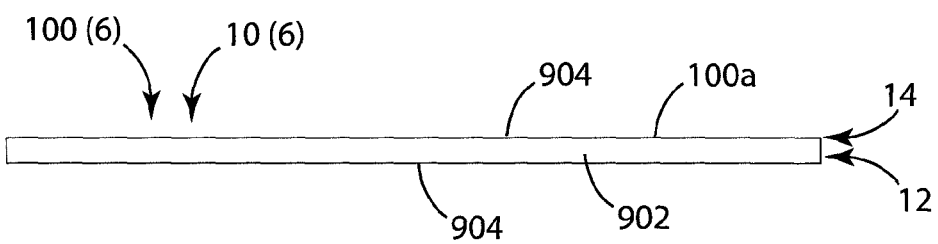
FIG. 9 shows a side view of a baffle seal constructed from a sheet of material in accordance with an illustrative embodiment of the invention.

FIG. 9 shows a side view of a baffle seal 100(6) constructed from a sheet of material 10(6). Sheet 10(6) comprises flexible primary layer 12 and flexible contact layer 14 that surrounds primary layer 12 and presents contact side 100a. Flexible primary layer 12 includes an elastomer sheet 902 (e.g., a silicone sheet), and flexible contact layer 14 includes a parylene conformal coating 904. Coating 904 has a low coefficient of friction (i.e., not more than 0.4) at contact side 100a.

Figure 10:
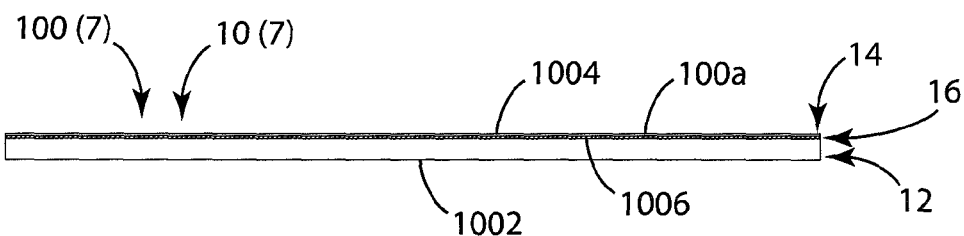
FIG. 10 shows a side view of a baffle seal constructed from a sheet of material in accordance with an illustrative embodiment of the invention.

FIG. 10 shows a side view of a baffle seal 100(7) constructed from a sheet of material 10(7). Sheet 10(7) comprises flexible primary layer 12, flexible contact layer 14 that presents contact side 100a, and flexible third layer 16. Flexible primary layer 12 includes a standard elastomer 1002 (e.g., silicone), flexible contact layer 14 includes a laminate 1004, and third layer 16 includes a fiber cloth 1006. Standard elastomer 1002 and laminate 1004 are on opposed sides of fiber cloth 1006. Laminate 1004 has a low coefficient of friction (i.e., not more than 0.4), is at contact side 100a, and may include, for example, PTFE, FEP, ETFE, Teflon®-S, or PFA.

Those skilled in the art appreciate that variations from the specified embodiments disclosed above are contemplated herein and that the described test results are not limiting. The description should not be restricted to the above embodiments or test results, but should be measured by the following claims.

What is claimed is:

1. An aircraft system, comprising:
an aircraft baffle;
an aircraft cowl separated from the aircraft baffle by a gap, the aircraft cowl having a contact surface; and
a flexible aircraft baffle seal extending from the aircraft baffle to the aircraft cowl to seal the gap, the aircraft baffle seal having a contact side for contacting the contact surface of the aircraft cowl, the contact side having a kinetic coefficient of friction that is not more than 0.4, the aircraft baffle seal comprising an elastomer sheet and a laminate, the laminate being the contact side.

2. The aircraft system of claim 1, wherein the laminate contact side includes a material selected from the group consisting of polytetrafluoroethylene, fluorinated ethylene propylene copolymer, a copolymer of ethylene and tetrafluoroethylene, and a perfluoroalkoxy polymer resin.

3. The aircraft system of claim 2 wherein the elastomer sheet includes a layer of fiber cloth to reinforce the elastomer sheet and increase the durability of the elastomer sheet.

4. The aircraft system of claim 3, wherein a plurality of fasteners attach the aircraft baffle seal to the aircraft baffle.

5. The aircraft system of claim 1, wherein the contact side has a kinetic coefficient of friction that is not more than 0.25.

6. The aircraft system of claim 1, wherein the kinetic coefficient of friction is measured using the ASTM D 1894-01 test method with an opposing surface of stainless steel with a #8 finish, a cross head speed of 6 inches per minute, and modified with 0.25 psi surface pressure instead of 0.07 psi.

7. An aircraft system, comprising:
an aircraft baffle;
an aircraft cowl separated from the aircraft baffle by a gap, the aircraft cowl having a contact surface; and
an aircraft baffle seal extending from the aircraft baffle to the aircraft cowl to seal the gap, the aircraft baffle seal comprising a sheet of material having a flexible primary layer and a flexible contact layer presenting a contact side for contacting the contact surface of the cowl, the contact side having a kinetic coefficient of friction that is not more than 0.4.

8. The aircraft system of claim 7, wherein the sheet of material includes an elastomer and a laminate on opposed sides of a fiber cloth, the laminate being the contact side and having the kinetic coefficient of friction that is not more than 0.4.

9. The aircraft system of claim 8, wherein the laminate includes a material selected from the group consisting of polytetrafluoroethylene, fluorinated ethylene propylene copolymer, a copolymer of ethylene and tetrafluoroethylene, and a perfluoroalkoxy polymer resin.

10. The aircraft system of claim 7, further comprising a third layer for reinforcing and increasing the durability of the primary layer.

11. The aircraft system of claim 7, wherein a laminate is the contact side and has the kinetic coefficient of friction that is not more than 0.4.

12. The aircraft system of claim 11, wherein the laminate includes a material selected from the group consisting of polytetrafluoroethylene, fluorinated ethylene propylene copolymer, a copolymer of ethylene and tetrafluoroethylene, and a perfluoroalkoxy polymer resin.

13. The aircraft system of claim 7, wherein:
the primary layer includes an elastomer sheet and fiber cloth, the fiber cloth reinforcing the elastomer sheet to increase the durability of the elastomer sheet;
the contact layer includes a fluorocarbon film laminate at the contact side;
the primary layer is from 0.06 to 0.13 inches thick;
the contact layer is from 0.002 to 0.010 inches thick; and
the contact side has a coefficient of friction from 0.03 to 0.25.

14. The aircraft system of claim 7, wherein the kinetic coefficient of friction is measured using the ASTM D 1894-01 test method with an opposing surface of stainless steel with a #8 finish, a cross head speed of 6 inches per minute, and modified with 0.25 psi surface pressure instead of 0.07 psi.

* * * * *